United States Patent
Haug

(10) Patent No.: US 9,944,505 B2
(45) Date of Patent: Apr. 17, 2018

(54) OPERATING DEVICE

(71) Applicant: Thomas Haug, Birkenfeld (DE)

(72) Inventor: Thomas Haug, Birkenfeld (DE)

( * ) Notice: Subject to any disclaimer, the term of this patent is extended or adjusted under 35 U.S.C. 154(b) by 0 days.

(21) Appl. No.: 15/036,876

(22) PCT Filed: Sep. 21, 2015

(86) PCT No.: PCT/EP2015/001869
§ 371 (c)(1),
(2) Date: Nov. 25, 2016

(87) PCT Pub. No.: WO2016/045781
PCT Pub. Date: Mar. 31, 2016

(65) Prior Publication Data
US 2017/0081160 A1    Mar. 23, 2017

(30) Foreign Application Priority Data

Sep. 23, 2014 (DE) .................... 20 2014 007 585 U

(51) Int. Cl.
*B66C 13/40* (2006.01)
*G05G 9/047* (2006.01)
(Continued)

(52) U.S. Cl.
CPC .......... *B66F 9/07581* (2013.01); *A63F 13/24* (2014.09); *B66C 13/40* (2013.01); *G05G 9/047* (2013.01)

(58) Field of Classification Search
CPC ........ G08C 17/00; G08C 23/04; G05G 9/047; B61L 3/127; B60P 1/6445; B66C 19/007;
(Continued)

(56) References Cited

U.S. PATENT DOCUMENTS 5,401,025 A * 3/1995 Smith, III ............. A63F 9/0291
345/156
8,290,646 B2 * 10/2012 Ecton ...................... B61L 3/127
105/35
(Continued)

FOREIGN PATENT DOCUMENTS

DE          1827508 U       3/1961
DE       19949797 A1       11/2000
(Continued)

OTHER PUBLICATIONS

"HH MFSHL Lightweight & Sturdy Competitively Priced Fully Programmable Several Standards", URL:https://webarchive.org/web/20140915195052/http:fjwww.hetronic.com/hetronic/Documents/Brochures/BROC_HH_001.1, no crops-low-res p. 1-2.pdf (Sep. 2014).

*Primary Examiner* — Dionne H Pendleton
(74) *Attorney, Agent, or Firm* — Browdy and Neimark, P.L.L.C.

(57) ABSTRACT

The invention relates to a portable operating device (2), in particular in the form of a remote control device for lifting and industrial appliances, having a housing arrangement (4) which has an accommodating housing (6) for accommodating control electronics (12), a housing handle (8) which extends away from the accommodating housing (6), and a protective fork (10) which extends from an end (32), which is averted from the accommodating housing (6), of the housing handle (8) to the accommodating housing (6) and which, in so doing, covers the housing handle (8) at least to one side. Here, it is provided that the protective fork (10) has, at least in regions, two spaced-apart fork parts (36).

15 Claims, 3 Drawing Sheets

Figure 1:
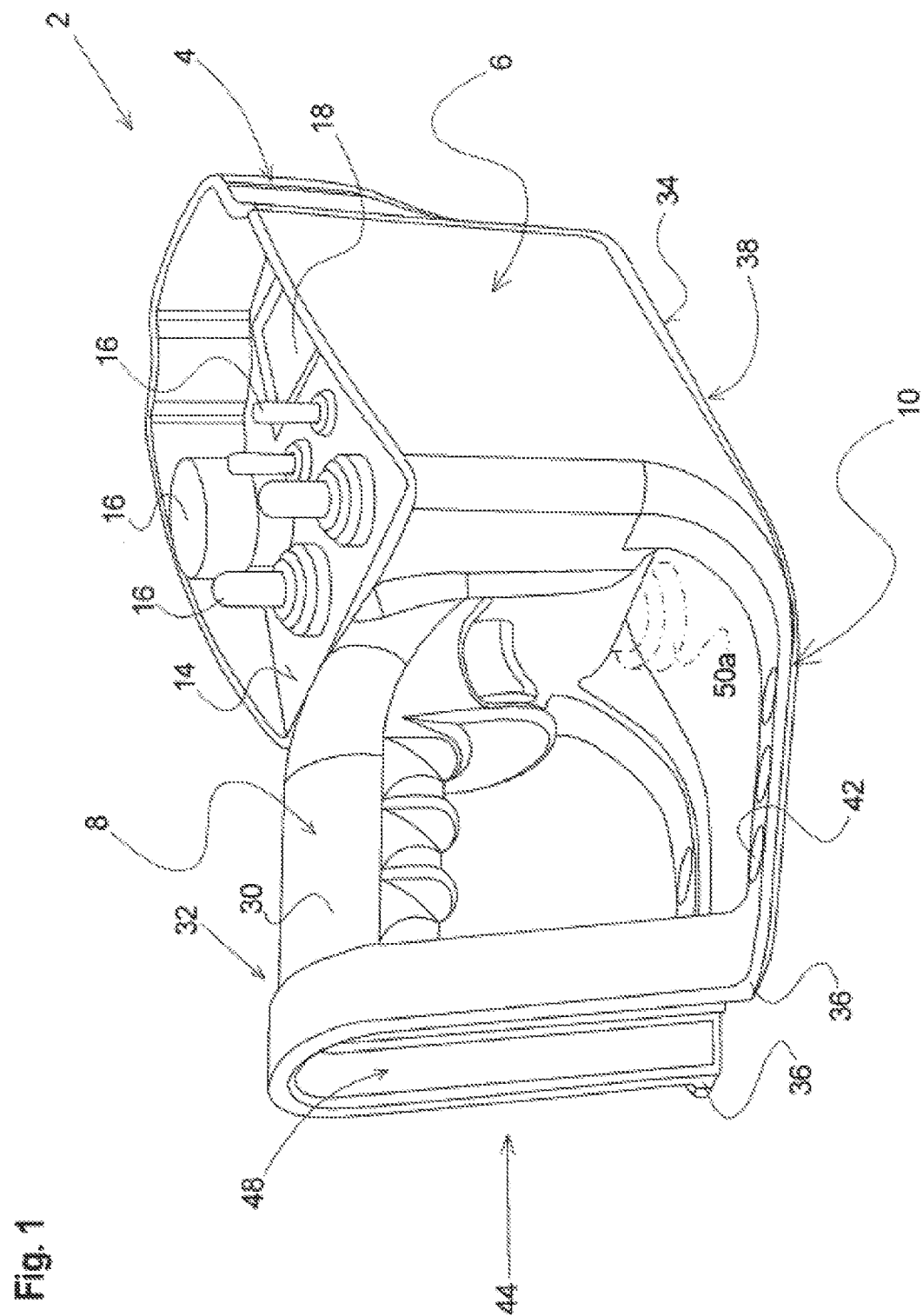

(51) Int. Cl.
*B66F 9/075* (2006.01)
*A63F 13/24* (2014.01)

(58) Field of Classification Search
CPC ........ B66C 13/40; B66F 7/20; B66F 9/07581;
Y10T 477/387; H04M 1/04; H04M
1/6066; H04M 1/725; H04M 2250/02;
H04M 1/72527; H04M 1/72544; H04M
1/72561; H04M 1/72533; H01L
2924/0002; H01L 2924/00; H01L 23/3672
See application file for complete search history.

(56) References Cited

U.S. PATENT DOCUMENTS

| | | | |
|---|---|---|---|
| 2003/0083114 A1* | 5/2003 | Lavin | G06F 3/0219 455/569.2 |
| 2007/0257625 A1* | 11/2007 | Brison | G08C 17/00 315/291 |
| 2008/0277130 A1 | 11/2008 | Kurzenberger et al. | |
| 2009/0000054 A1 | 1/2009 | Hampton et al. | |
| 2011/0263301 A1* | 10/2011 | Chang | H04B 1/3822 455/569.2 |

FOREIGN PATENT DOCUMENTS

| | | |
|---|---|---|
| DE | 202006003553 U1 | 7/2007 |
| DE | 102007021633 A1 | 11/2008 |
| DE | 102008030505 A1 | 1/2009 |
| DE | 202008008445 U1 | 11/2009 |
| EP | 2080728 A1 | 7/2009 |

\* cited by examiner

OPERATING DEVICE

The invention relates to a portable operating device, in particular in the form of a remote control device for lifting and industrial appliances, according to the preamble of claim 1 The operating device has a housing arrangement which has an accommodating housing for accommodating operating elements and a control electronics, a housing handle which extends away from the accommodating housing and a protective fork. In this case the protective fork extends at the same time from an end, which is averted from the accommodating housing, to the accommodating housing and which, in so doing, covers the housing handle towards the outside, at least to one side.

Such hand-held operating devices are widely used nowadays for operation in particular of mobile lifting and industrial appliances. Such an operating device from HETRONIC can be obtained on the market, for example under the designation HH MFSHL. This device also has a protective fork which extends from the rear end of the housing handle to an electronics housing and by means of which it is possible to shield an operating element arranged on the housing handle or the operator's hand holding the housing handle. Moreover, the protective fork can be used as a stand means for the operating device to be put down.

A disadvantage of the known operating device is that the protective fork does not offer a very stable stand for the operating device when it is put down and also its protective function only extends to a very limited region of the operating device.

The object of the invention is to avoid the aforementioned disadvantages in a generic operating device and to expand the safety function of the protective fork.

This object is achieved by an operating device having the features of claim 1. In this case the protective fork has two fork parts spaced apart from one another at least in some regions, in particular over a portion extending substantially parallel to the housing handle. As a result it is possible to put the operating device down in a particularly stable manner by means of the protective fork on a supporting surface, in particular when a relatively large distance is provided between the two fork parts. As a result a particularly tilt-proof support of the operating device can be ensured, which is achieved by at least three bearing points lying relatively far apart from one another, so that the support takes place in a statically determined or over-determined manner. Furthermore, in this way further regions are provided which are protected towards the outside, are arranged for example between the fork parts, and in which particular further operating parts can be accommodated.

In a particularly advantageous embodiment at least one magnet receptacle for a magnet is recessed on the fork parts. As a result magnetic attraction forces can be generated on the fork parts and enable a particularly stable mounting of the operating device when this device is put down on a metallic supporting surface. In this way it is possible to prevent the operating device from being tipped over and thereby damaged as it is put down or when it has been put down. Moreover, in this way the operating device can also be fastened to an oblique or vertical metallic surface without sliding off.

In this case it is advantageous if the at least one magnet receptacle is recessed in the form of a blind bore into the respective fork part, so that a particularly simple and durable fastening of the magnet and possibly a tight closure of the magnet receptacle are possible. Moreover, as an alternative to this it would be possible for the at least one magnet to be overmolded with the production material during production of the fork parts. In any case it is ensured that, as the operating device is being put down, the magnet or magnets cooperate(s) with the supporting surface only with the interposition of a remaining material layer of the fork parts, so that at least they cannot be directly acted upon mechanically by the supporting surface and for example interrupted thereby.

A battery compartment is advantageously integrated into the housing handle, thereby enabling a more compact design of the accommodating housing which serves to accommodate the electronics. Moreover, in this way a balanced weight distribution can be achieved inside the operating device. In this way the operating device as a whole can be handled more conveniently.

Advantageously at least one accommodating region for a further element is provided between the fork parts. In this way it is possible to position at least one structural or functional element of the operating device in a region of the operating device in which this element is simultaneously shielded on several sides towards the outside by the protective fork.

In this connection it is advantageous if the further element arranged in the accommodating region is formed by an emergency stop switch arranged on the rear side adjacent to the end of the housing handle. In this way the emergency stop switch can be positioned spaced apart from the remaining operating elements of the operating device, in order to be able to preclude inadvertent actuation as far as possible. Concurrently in this position a fast actuation of the emergency stop switch from the rear side of the operating device is possible at any time, in order to be able to interrupt an operating process of a controlled lifting or industrial appliance if necessary in a short time.

As an alternative or in addition to this, the further element arranged in the accommodating region can also be formed by a battery compartment. This may in turn be provided as an alternative to the battery compartment accommodated for example in the housing handle or in addition thereto. As a result it is possible, on the one hand, to distribute the weights inside the operating device so that this device can be handled comfortably. On the other hand, in this way the capacitance of the batteries carried in the operating device can be substantially increased.

An alternative or additional emergency stop switch which extends perpendicular to the base inside a projection region between the contours of the fork parts is advantageously arranged on a base of the accommodating housing. In this way it is possible for the user to press the emergency stop switch by way of example against the thigh, in order also to be able to trip it with only one hand. In this case due to the special arrangement relative to the fork parts it can be ensured that the emergency stop switch is not inadvertently actuated when the operating device is put down or dropped.

Furthermore it is advantageous if a trigger which in particular operates proportionally is provided on the housing handle. Due to this positioning of the trigger it is protected particularly well towards the outside, so that inadvertent actuation thereof, for example in the event of a fall or tilting, can be precluded as far as possible.

In a further advantageous embodiment the trigger co-operates with a Hall effect sensor which enables an easier connection of the trigger held on the housing handle to the controlled electronics accommodated in the accommodating housing.

Furthermore it is advantageous if a dead man's handle, which interrupts a control operation as soon as no actuation of the switch takes place, is provided on the housing handle.

In a further advantageous embodiment of the operating device a display is accommodated on the accommodating housing. In this way further information or operating possibilities can be made available to the user of the operating device.

Furthermore, it is advantageous if the housing arrangement is produced, at least in its essential parts, from a plastic, so that relatively complex forms can also be produced cost-effectively.

Moreover, it is advantageous in this case if the plastic is formed by a thermoplastic elastomer. In this way the housing arrangement is relatively insensitive to mechanical stresses, such as for example in the event of a fall from a height which is possible in conventional use. Moreover, in this way the elements accommodated inside the housing, such as in particular electronic components, are protected particularly well against stresses from outside.

Furthermore it is advantageous if an application region, to which the fingers of a hand holding the operating device can be applied, is provided on the housing handle, wherein a counterpart application region opposite the application region is formed on the protective fork. In this case the counterpart application region can project like a web from the protective fork or alternatively it can be integrated into the protective fork. In this case the counterpart application region is arranged, for example, in the region of the little finger of the hand holding the device, so that it can prevent a tilting movement of the operating device, in particular forwards around the index finger.

Figure 2:
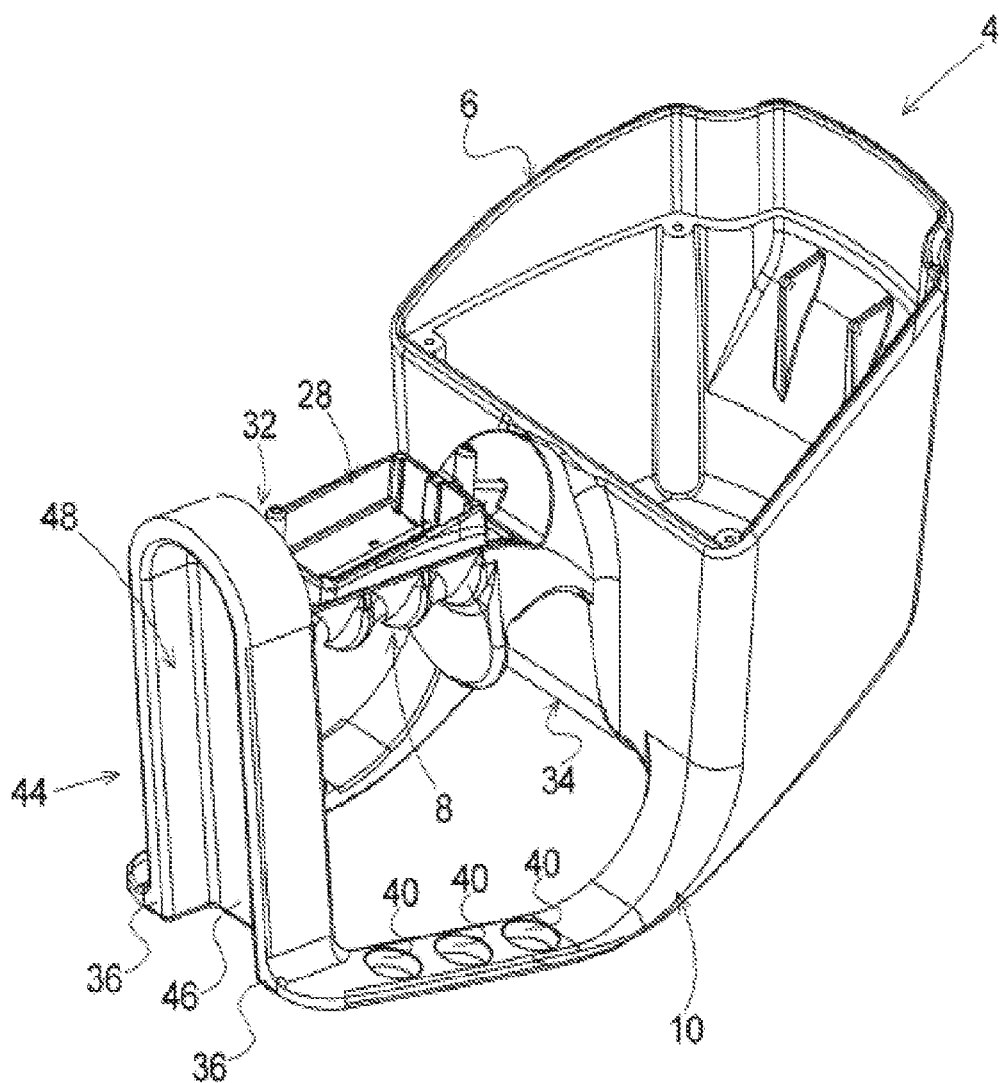
Figure 3:
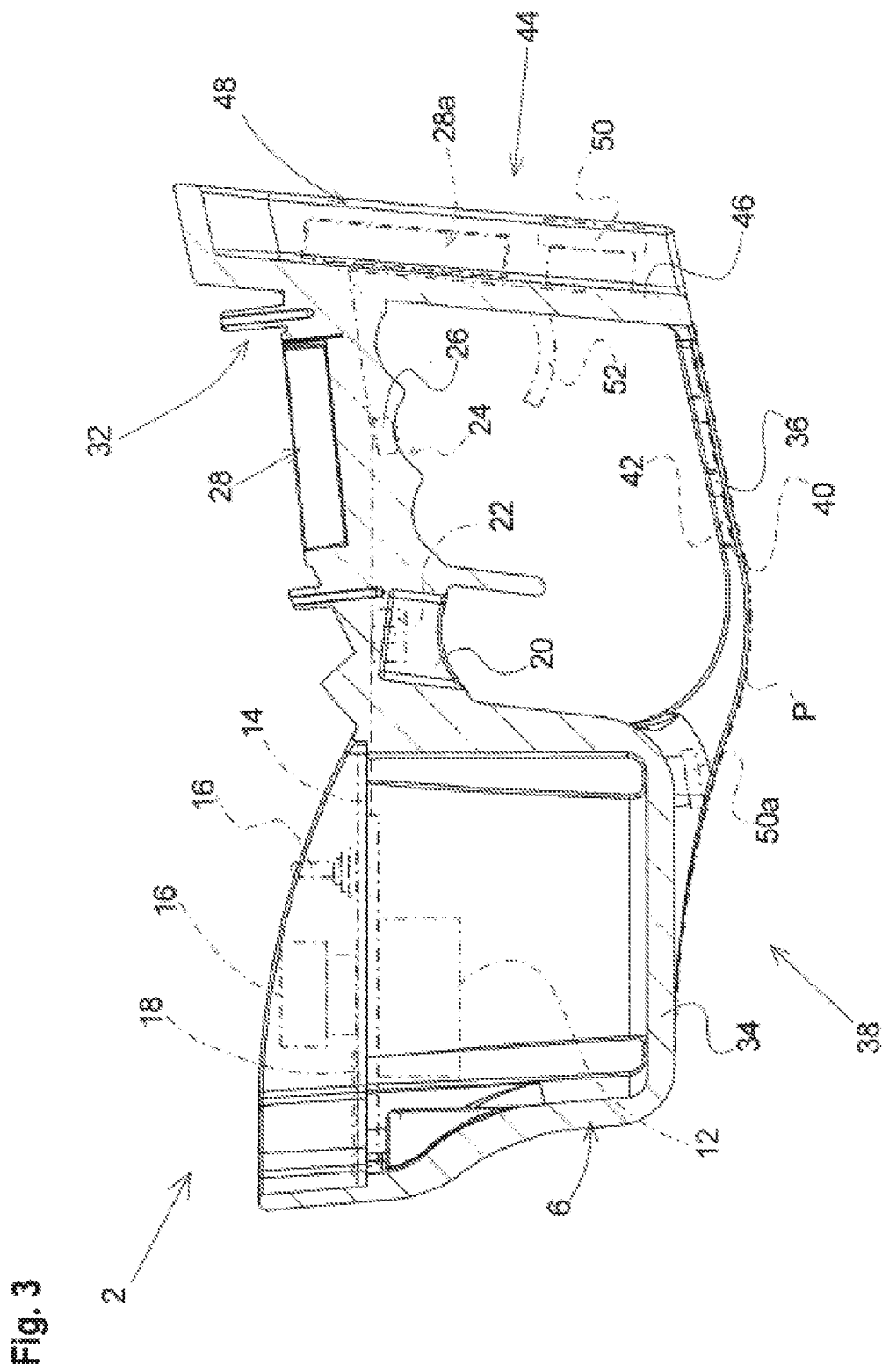

An exemplary embodiment of the invention is illustrated in the drawings. In the drawings:

FIG. 1 shows a perspective view of an operating device according to the invention, FIG. 2 shows a perspective view of a housing arrangement of the operating device according to FIG. 1, and FIG. 3 shows a section through the housing arrangement according to FIG. 2.

FIG. 1 shows an operating device 2 in the form of a remote control device, such as for example for a crane. This operating device has a housing arrangement 4, which is made up predominantly of an accommodating housing 6, a housing handle 8 and a protective fork 10. In this case the housing arrangement 4 is produced, at least in its essential parts, from a plastic, such as for example a thermoplastic elastomer.

As can be seen in particular from FIGS. 2 and 3, the accommodating housing 6 is formed in the shape of a box and serves for protected accommodation of electrical and electronic components of a control electronics 12, as illustrated in FIG. 3 by dash-dot lines. Moreover, a plurality of operating elements 16, which comprise inter alia two joysticks, are mounted on a bearing plate 14 which closes the accommodating housing 6 from above. Moreover, a display 18 can be provided on the bearing plate 14, and by means of this display different information such as for example operating states can be notified to the user, as can be seen in particular according to FIG. 1.

On the housing handle 8, which projects from the accommodating housing 6, a trigger 20 is arranged in such a way that it can be actuated by the index finger of a hand holding the housing handle 8 (not shown). In this case the trigger 20 can be designed for example as a proportionally operating switch which generates a respective control signal as a function of the extent to which the trigger 20 is actuated. For this purpose a Hall effect sensor device 22 which is connected to the control electronics 12, as shown in FIG. 3, can for example be provided on the trigger 20. Furthermore, a dead man's handle 26 which is likewise connected to the control electronics 12 can be additionally provided on the housing handle 8 for example on an application region 24 provided for the middle, ring and little fingers of the hand holding the handle.

As can be seen in particular from FIGS. 2 and 3, a battery compartment 28 can be integrated into the housing handle 8 and can be closed by a cover 30, as illustrated in FIG. 1.

One end 32 of the housing handle 8 facing away from the accommodating housing 6 is connected by the protective fork 10 to a base 34 of the accommodating housing 6 and extends in some parts substantially parallel to the housing handle 8. In this case the protective fork 10 forms two fork parts 36 which are spaced apart from one another at least partially. In this way the fork parts 36 together with the base 34 form a common stand region 38, by means of which the operating device 2 can be set down with at least three bearing points located relatively far apart from one another, and thus in a non-tilting manner, on a supporting surface.

Moreover, as can also be seen from FIG. 2, magnet receptacles 40 which are formed as blind bores are recessed into the fork parts 36. As a result a cylindrical magnet 42 can be glued in each case into the magnet receptacles 40, and is protected at the bottom by a remaining material layer of the respective fork part 36 (see FIG. 3).

Moreover, the two fork parts 36 are guided parallel to one another on a rear side 44 of the housing arrangement 4 and are connected to one another by a wall 46 in such a way that they form an accommodating region 48 for the arrangement of at least one further structural or functional element on the rear. In this way it is, for example, possible to accommodate an emergency stop switch 50 or an alternative or additional battery compartment 28a in protected manner in the accommodating region 48, as illustrated in FIG. 3 by dash-dot lines. In this case the accommodating region 48 is accessible from the rear side 44 of the operating device 2. Thus in the case of the emergency stop switch 50 provided here this switch can be actuated from the rear side, in order to be able to stop a control operation abruptly in an emergency.

Alternatively or in addition to this, an emergency stop switch 50a can also be provided on the base 34, said switch extending inside the projection region P between the two fork parts 36, as shown by dash-dot lines in FIG. 3. Due to this arrangement of the emergency stop switch 50a an inadvertent actuation can be prevented when the operating device 2 is put down or dropped.

Moreover, as can also be seen from FIG. 3, a counterpart application region 52 which lies opposite the application region 24 can be provided on the protective fork 10, as illustrated by dash-dot lines, against which for example a little finger of a hand holding the operating device 2 can be applied (not shown). In this way a tilting movement of the operating device occurring, for example, around the region of the trigger 20 or around the index finger of the hand holding the device can be prevented more easily. As an alternative to the illustrated web-like formation of the counterpart application region 52, this region can also be integrated, for example, into the protective fork 10.

The invention claimed is:

1. A portable operating device, in particular in the form of a remote control with a housing arrangement which has:
an accommodating housing for accommodating a control electronics;

a housing handle extending away from the accommodating housing; and a protective fork which extends from an end of the housing handle facing away from the accommodating housing to the accommodating housing and covers the housing handle at least on one side, characterized in that the protective fork has two fork parts spaced apart from one another at least in some regions, the protective fork extending at least partially over a bottom side of the portable operating device to form a stand region.

2. The operating device according to claim 1, characterized in that at least one magnet receptacle for a magnet is recessed on the fork parts.

3. The operating device according to claim 2, characterized in that at least one magnet receptacle is recessed in the form of a blind bore into the respective fork part.

4. The operating device according to claim 1, characterized in that a battery compartment is integrated into the housing handle.

5. The operating device according to claim 1, characterized in that at least one accommodating region for a further element is provided between the fork parts.

6. The operating device according to claim 5, characterized in that the further element arranged in the accommodating region is formed by an emergency stop switch arranged on the rear side.

7. The operating device according to claim 4, characterized in that the further element arranged in the accommodating region is formed by an alternative or additional battery compartment.

8. The operating device according to claim 1, characterized in that an emergency stop switch is arranged on a base of the accommodating housing inside a contour of the fork parts.

9. The operating device according to claim 1, characterized in that a trigger which preferably operates proportionally is provided on the housing handle.

10. The operating device according to claim 9, characterized in that the trigger co-operates with a Hall effect sensor.

11. The operating device according to claim 1, characterized in that a dead man's handle is provided on the housing handle.

12. The operating device according to claim 1, characterized in that a display is provided on the accommodating housing.

13. The operating device according to claim 1, characterized in that the housing arrangement is produced from a plastic.

14. The operating device according to claim 13, characterized in that the plastic is formed by a thermoplastic elastomer.

15. The operating device according to claim 1, characterized in that an application region for the partial application of the fingers of a hand holding the operating device is provided on the housing handle, and a counterpart application region opposite the application region is formed on the protective fork.

* * * * *